United States Patent [19]

Benjestorf

[11] Patent Number: 4,817,326
[45] Date of Patent: Apr. 4, 1989

[54] WEIGHTED CASTING BUBBLE

[76] Inventor: Clarence Benjestorf, 14325 McNab, #80, Bellflower, Calif. 90706

[21] Appl. No.: 117,982

[22] Filed: Nov. 9, 1987

[51] Int. Cl.$^4$ .............................................. A01K 93/00
[52] U.S. Cl. ..................................... 43/43.1; 43/44.9
[58] Field of Search .................. 43/43.14, 43.1, 44.9, 43/44.87, 44.92

[56] References Cited

U.S. PATENT DOCUMENTS

| 12,060 | 12/1854 | Hoard | 43/43.14 |
| 2,693,049 | 11/1954 | Atton | 43/44.9 |
| 2,726,474 | 12/1955 | Soskice | 43/43.14 |
| 2,741,864 | 4/1956 | Shotton | 43/44.9 |
| 2,827,731 | 3/1958 | Haynes | 43/43.14 |
| 3,664,053 | 5/1972 | Beverly | 43/43.14 |
| 3,736,690 | 6/1973 | Witkowski | 43/43.14 |
| 4,449,318 | 5/1984 | Lane | 43/44.9 |

Primary Examiner—Gene P. Crosby
Attorney, Agent, or Firm—Stetina and Brunda

[57] ABSTRACT

A hollow tube capable of passing one or more turns of fishing line through its bore is encased by a spheroidal bubble member, creating an airtight chamber between the tube and the bubble member. Within this airtight chamber a predetermined amount of high density lead metal shot allows predetermination of the aggregate weight and density of the casting bubble. The weight is important during casting and the density is important for controlled flotation during lure retrieval. The shifting high density material changes the center of gravity of the weighted casting bubble between those times when the bubble is cast and during its retrieval. During retrieval the weighted casting bubble resists angular rotation.

1 Claim, 1 Drawing Sheet

WEIGHTED CASTING BUBBLE

BACKGROUND OF THE INVENTION

The present invention generally concerns fishing tackle, and more specifically concerns combination casting weights and controlled flotation devices in the shape of bubbles which are affixed to fishing lines.

A casting bubble is a low cost, plastic float which is affixable to a fishing line at or near the lure end thereof in order to provide (i) weight for casting and (ii) flotation during lure retrieval. A casting bubble is taught in U.S. Pat. No. 2,827,731. The casting bubble consists of a hollow tube which is capable of passing a fishing line through its bore and a bubble member which is disposed about the tube. The bubble member creates an airtight chamber between itself and the exterior of the hollow tube. The airtight chamber is filled with air, and thus provides flotation. The aggregate assembly is several ounces in weight and approximately one cubic inch in displacement.

The prior art casting bubble is normally affixed to a fishing line which passes through the bore of the hollow tube at or near the position whereat a lure is also affixed to the fishing line. When the fishing line is cast from and by a fishing pole, then the weight of the casting bubble, which is spherical and aerodynamic in shape, facilitates casting of great lengths. The weight of the hollow casting bubble, although modest, is especially useful if the lure is lightweight. During lure retrieval the casting bubble provides flotation and, due to its size and potential coloration, enhanced visibility as to the approximate position of the lure.

The prior art casting bubble comprises a substantially spherical and symmetrical device, which is typically unalterable in weight, density and/or center of gravity. Particularly, if it is desired to add more weight to a fishing line proximate the location of the casting bubble than is provided by the casting bubble itself, then separate and severable lead weights or the like must normally be employed. These added weights increase aerodynamic and hydrodynamic drag and turbulance, and are cumbersome and time consuming to attach. If such weights are not attached, however, then the hollow casting bubble functions strongly as a flotation device and will float the fishing line and the attached lure during the retrieval of such line and lure. Accordingly, it is desired that a casting bubble be weighted in order to moderate its flotation, especially if other advantages to the art of fishing could be so obtained by weighting of a casting bubble.

SUMMARY OF THE INVENTION

The present invention is embodied in a weighted casting bubble device and in a system of fishing tackle based upon such a device. The weighted casting bubble in accordance with present invention includes a hollow tube capable of passing a fishing line through its bore, and a bubble member disposed about the tube and creating an airtight chamber between the tube and the member. The weighted casting bubble further includes a predetermined amount of high density material contained within the chamber. This high density material is added in order that the combined weight and density of the tube, bubble member, and the contained material may be controllably predetermined. By this addition of high density material, both the weight and density, or equivalent buoyancy, of a casting bubble are controllably predetermined in a manner beneficial to the use of such casting bubble in fishing. Particularly, the weight of the casting bubble is increased, which facilitates longer casting, while the density is also increased to a selectively predetermined level, which selectively allows neutral, nearly neutral or negative buoyancy during use. The benefits of use of such device is that boat shy fish often look twice at a short cast bait; however, when the bait is cast out further and allowed to run (i.e. swim) more freely, staying lively, the chance of hookup increases dramatically.

Moreover, in accordance with the present invention, the high density material within the casting bubble is preferably capable of shifting portion within the bubble's chamber. This shifting of the high density material makes the center of gravity of the weighted casting bubble change position between those times wherein the bubble is cast in an essentially arcuate motion, and those other times where the bubble is retrieved in an essentially straight line motion. At neither time is the center of gravity positioned at the volumetric center of the weighted casting bubble. The effect of such changes in the position of the center of gravity causes the mass center of the casting bubble to be located at a furthest portion of an arc during a fishing cast. This shifting position of the center of gravity also means that the weighted casting bubble is not axially symmetric during lure retrieval, but instead will be more heavily weighted by the shifting material in a particular axial direction. This weighted direction will assume and tend to maintain a fixed downward orientation within the water.

This fixed orientation both guards the fishing line against twisting or rotation, and tends to hold any lure which is affixed to the fishing line near the casting bubble at an approximately equal angular degree of orientation during the retrieval of the lure. This constant angular orientation alleviates or eliminates a possible rotational component in lure movement, which rotational component of movement may be highly undesirable with certain lures which are generally desired to exhibit only lateral, side-to-side motion.

Particularly in accordance with the present invention, the shifting high density material comprises granular or pelletized metal and, preferably lead shot. The amount of this granular metal lead shot is adjusted to establish the desired aggregate weight and density of the entire weighted casting bubble apparatus.

BRIEF DESCRIPTION OF THE DRAWINGS

These and other aspects of the present invention will become more apparent upon reference to the drawings wherein.

DESCRIPTION OF THE PREFERRED EMBODIMENT

Figure 1:
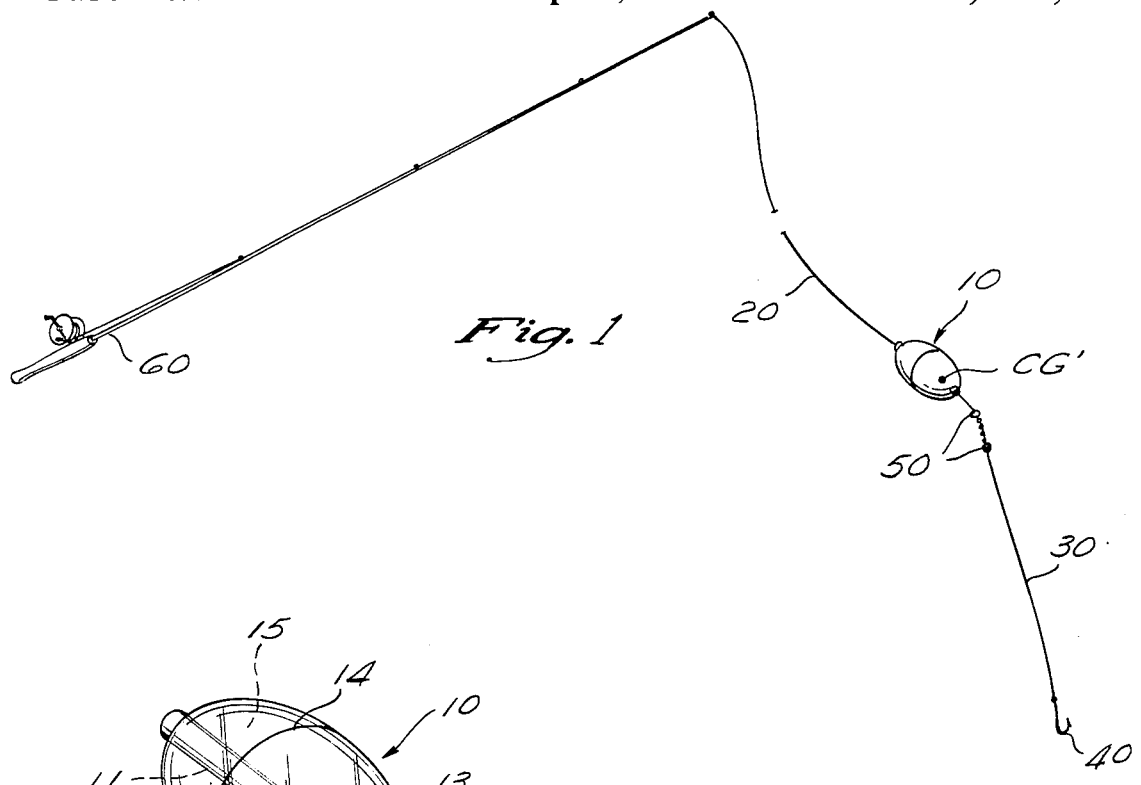
FIG. 1 is a perspective view showing the weighted casting bubble in accordance with the present invention deployed in operative position upon a fish line.

The preferred embodiment of a weighted casting bubble in accordance with the present invention is generally shown in FIGS. 1–4. The weighted casting bubble 10 is affixed upon a fish line 20, generally near the distal end thereof which may attach a leader 30 and/or a hook 40. The fishing line 20 is passed through the central aperture or bore 2 (shown in FIGS. 2, 3) of the weighted casting bubble 10. It is precluded from being pulled back out of such aperture 12 either (i) by the affixation of weights and/or swivels 50 which are too large to pass through the aperture, (ii) by the knotting of the fishing line 20, and/or (iii) by passing the fishing line 20 over the exterior of weighted casting bubble 10 and rethreading the aperture (thereby forming a loop).

In its position near the lure end of the fish line 20, the weighted casting bubble 10 in accordance with the present invention adds weight. This weight aids in the casting of the lure 40 and fish line 20 from and by the fish pole 60. The weighted casting bubble 10 is aerodynamically shaped, being substantially in the shape of a three dimensional ellipse. It casts well and reliably in all atmospheric conditions.

Figure 2:
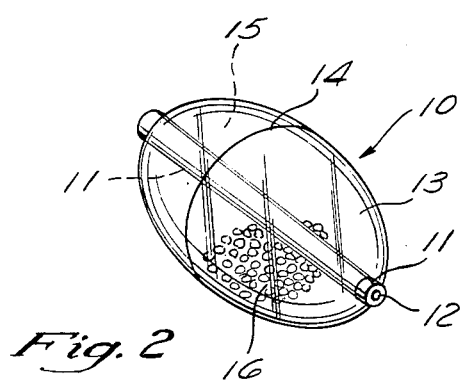
FIG. 2 is a detailed perspective view showing the weighted casting bubble in accordance with the present invention.
Figure 3:
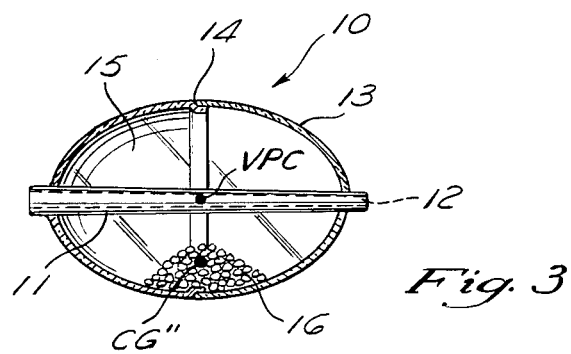
FIG. 3 is a side view, partially in cross-section, showing the weighted casting bubble in accordance with the present invention.

The detailed construction of the weighted casting bubble 10 in accordance with the present invention is particularly shown in FIGS. 2 and 3. The general construction of the bubble is in accordance with the teaching of U.S. Pat. No. 2,827,731, the contents of which are incorporated herein by reference. The weighted casting bubble 10 has a central hollow tube 11 with a bore 12 which is capable of passing one or more turns of fishing line 20. Sealed about the hollow tube 11 is a bubble member or spherical shell 13. Both the bubble member 13 and hollow tube 11 are preferably made of plastic. The bubble member 13 may be made from two hemispheroidal shells which are joined along central circumferential seam 14, nominally by thermoplastic welding. The bubble member 13 is also thermoplastically welded or glued to the hollow tube 11 circumferentially about the external surface thereof proximate each end, thereby forming an internal airtight chamber 15 to the weighted casting bubble 10.

In accordance with the present invention, the airtight chamber 15 of the weighted casting bubble 10 contains not only air but additionally, a predetermined amount of high density material 16. This high density material 16 is capable of shifting position within the airtight chamber 15 and is preferably granular in nature. The high density material 16 comprises pellets of metal and preferably lead shot.

The predetermined amount of high density material 16 which is added to the airtight chamber 15 of the weighted casting bubble 10 in accordance with the present invention establishes both the weight and density of the entire weighted casting bubble 10. Particularly, the density may be either positive, neutral or negative density for either fresh or salt water. A plurality of weighted casting bubbles 10, exhibiting a range of density and equivalent bouyancy, are normally offered to the fisherman as a comprehensive fishing tackle system. A particular weighted casting bubble 10 of the fishing tackle system may be selected by the fisherman in accordance with both the weight which he desires to use in casting, and the bouyancy which he desires to use during lure retrieval. The benefits of use of the present invention is that the added weight of the present invention allows further casting of the bait to thereby allow even shy fish to strike the same. Further, when in water, the present invention supports the weight of the line to the leader such that the line bait only carries the small weight of the line from the present invention to the hook, thereby allowing better movement and prolonged life of the live bait.

Figure 4:
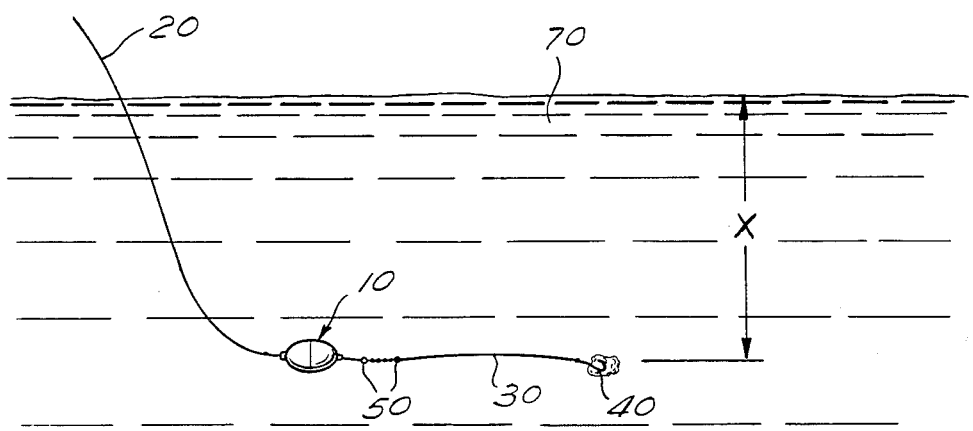
FIG. 4 is a diagrammatic view showing the retrieval of the weighted casting bubble in accordance with the present invention as affixed to a fish line.

Particularly, as illustrated in FIG. 4, the weighted casting bubble 10 in accordance with the present invention may be filled with a predetermined amount of high density material 16 so that it exhibits approximately neutral bouyancy, as opposed to the highly positive bouyancy which it would exhibit should it not be filled with any high density material 16. The neutral bouyancy readily permits the retrieval of a lure 40 at a subsurface depth X within a body of water 70. This is to be contrasted with retrieval at or near the surface of such body of water 70 which would occur with an unweighted, highly bouyant prior art unweighted casting bubble.

Further in accordance with the present invention, the shifting high density material 16 makes the center of gravity within the weighted casting bubble 10 change position wherein the bubble 10 is cast in an essentially arcuate motion (shown in FIG. 1), and wherein the bubble 10 is retrieved in an essentially straight line motion (shown in FIG. 4). At neither time is the center of gravity positioned at the volumetric physical center, labeled VPC in FIG. 3, of the weighted casting bubble 10. Rather, during casting the high density material 16 shifts under centrifugal force to a distal position within weighted casting bubble 10, which is remote from fishing pole 60 and close to lure 40. This displaced position is illustrated as center of gravity CG' in FIG. 1. This shifting places the mass center of the bubble at an increased arcuate length about the pivot axis provided by fishing pole 60. At this increased arcuate length it will enjoy a higher velocity and will accumulate more energy (mass X velocity$^2$) then it would have should the center of gravity have remained fixed at or near the volumetric physical center (VPC) of the weighted casting bubble 10.

After the weighted casting bubble 10 has hit the body of water 70 and settled therein, the shifting high density material 16 will assume a position radially to one side of the hollow tube 11 which is illustrated in FIG. 3. At this time the center of gravity will be substantially at the illustrated point CG'', which point is radially displaced from the hollow tube 11 at that approximate axial position along such tube 11 where the volumetric physical center (VPC) exists. The particular radial quadrant or other angular sector within the weighted casting bubble 10 the shifting high density material 16 will ultimately settle into is, at the completion of casting, essentially unknown. However, the shifting high density material 16 will settle into essentially one radial sector, as illustrated in FIGS. 2 and 3. This sector will thereafter become the "bottom" of the weighted casting bubble 10 during lure retrieval.

The weighted casting bubble 10 will resist angular rotation, and will tend to remain in an angular orientation wherein that sector which contains the shifting high density material 16 is disposed downwardly. This means that the fishing line 20 which passes through the bore 12 of the weighted casting bubble 10 will be precluded from twisting or rotating, especially if tightly affixed to the weighted casting bubble 10 such as by looping through it two or more times. This anti-rotational bias is useful to prevent line twisting upon retrieval, and is especially useful to assure that no rotational torque is provided to the lure 40 during its retrieval. This absence of rotational torque is important with certain lures which exhibit a side-to-side or other preferred motion in combination with which preferred motion it is undesirable to induce a further, complexing rotational component. Therefore, the present invention may be seen to facilitate "level" lure retrieval wherein "level" does not mean a predetermined angle of retrieval but rather, means a set and invariant angle of retrieval once retrieval is commenced.

In accordance with the preceding discussion, the present invention will be understood to be embodied in a fishing tackle device and in a fishing tackle system of a plurality of such devices and in a method of using such devices. Each device is a variably predetermined weight and predetermined density, shifting center of gravity casting weight and controlled flotation device which may be attached to a fishing line. The devices, and the fishing tackle system, in accordance with the present invention have been particularly taught to be in the context of a particular configuration of such a device called a weighted casting bubble. It would be within the ability of one skilled in the art to adapt the principles of shifting high density material exhibited by the present invention to hollow shapes other than casting bubbles, or spheres. For example, such a shifting weight could be employed within a hollow body of the lure itself. Additionally, it would be within the ability of one skilled in the art to produce a hollow tube 11 which is removably mounted air-tight, such as by screw threads, to a bubble member 13. With the construction of the present invention which allows reassembly, the predetermined amount of high density material 16 within the weighted casting bubble 10 may be variably established by a fisherman at a fishing location prior to and during use of the weighted casting bubble.

It is also intended that the weighted casting bubble in accordance with the present invention may be transparent, translucent or opaque. It may be colored and variably colored as besuits the intended fishing application. Particularly, the surface coloration of a plurality of weighted casting bubbles may exhibit a gradient in lightness which is proportional to the variation in density between the plurality of weighted casting bubbles. Particularly, if this proportionality causes the denser weighted casting bubbles to be of lighter color, then a range of weighted casting bubbles will exhibit similar luminance at the variously increasing depths of water at which each is retrieved Additionally, the color variation aids the fisherman in selection of an appropriately dense weighted casting bubble.

According to these and other obvious variations, the present invention should be defined in accordance with the terms of the following claims only, and not solely in accordance with that preferred embodiment in which the present invention has been taught.

What is claimed is:

1. A fishing tackle system of variably-predetermined-weight, variably-predetermined-density, shifting-center-of-gravity fishline-attachable combinatorial casting weights and controlled floatation devices, the fishing tackle system comprising:
   a plurality of selectively weighted casting bubbles, each weighted casting bubble comprising:
      a hollow tube, universal among the plurality of weighted casting bubbles, capable of passing a fishing line through its bore;
      a bubble member, universal among the plurality of weighted casting bubbles, disposed about the tube for creating an airtight chamber;
      a predetermined amount, unique to each weighted casting bubble, of positionally shifting high density material;
      wherein by the predetermined amount of high density material the aggregate weight and density of the weighted casting bubble is also predetermined;
      wherein by the positional shifting of the high density material during casting and during retrieving of the weighted casting bubble its center of gravity is shifting; and
      wherein selected ones of the plurality of selectively weighted casting bubbles include surface coloration suitable to attract fish;
      wherein the surface coloration is gradient in lightness in proportion to the density of each of the selected ones of the plurality of selected weighted casting bubbles.

* * * * *